United States Patent
Russo et al.

(10) Patent No.: US 9,131,257 B2
(45) Date of Patent: Sep. 8, 2015

(54) METHOD AND SYSTEM FOR REMOTE VIDEO MONITORING AND REMOTE VIDEO BROADCAST

(75) Inventors: Paul M. Russo, Los Altos Hills, CA (US); Jonathan Russo, La Jolla, CA (US); Michael Russo, La Jolla, CA (US)

(73) Assignee: PEEKABOO CORPORATION, Bermuda (GB)

(*) Notice: Subject to any disclaimer, the term of this patent is extended or adjusted under 35 U.S.C. 154(b) by 0 days.

(21) Appl. No.: 13/519,065

(22) PCT Filed: Nov. 4, 2011

(86) PCT No.: PCT/US2011/059357
§ 371 (c)(1),
(2), (4) Date: Jun. 25, 2012

(87) PCT Pub. No.: WO2013/066347
PCT Pub. Date: May 10, 2013

(65) Prior Publication Data
US 2014/0237493 A1    Aug. 21, 2014

(51) Int. Cl.
| | |
|---|---|
| H04N 21/2543 | (2011.01) |
| H04N 7/18 | (2006.01) |
| H04N 21/2187 | (2011.01) |
| H04N 21/472 | (2011.01) |
| H04N 21/61 | (2011.01) |
| H04N 21/63 | (2011.01) |
| H04N 21/218 | (2011.01) |

(Continued)

(52) U.S. Cl.
CPC .... *H04N 21/25435* (2013.01); *G08B 13/19684* (2013.01); *H04N 7/181* (2013.01); *H04N 21/2187* (2013.01); *H04N 21/21805* (2013.01); *H04N 21/2343* (2013.01); *H04N 21/2396* (2013.01); *H04N 21/2543* (2013.01); *H04N 21/2743* (2013.01); *H04N 21/41407* (2013.01); *H04N 21/4223* (2013.01); *H04N 21/47217* (2013.01); *H04N 21/6125* (2013.01); *H04N 21/6175* (2013.01); *H04N 21/632* (2013.01); *G08B 13/19656* (2013.01); *G08B 13/19663* (2013.01); *G08B 13/19676* (2013.01); *G08B 13/19695* (2013.01)

(58) Field of Classification Search
USPC .............................................. 725/1, 14, 25, 98
See application file for complete search history.

(56) References Cited

U.S. PATENT DOCUMENTS

| | | | |
|---|---|---|---|
| 7,013,288 B1 | 3/2006 | Reifel et al. | |
| 8,543,665 B2 * | 9/2013 | Ansari et al. | 709/218 |

(Continued)

FOREIGN PATENT DOCUMENTS

| | | |
|---|---|---|
| EP | 1222821 A1 | 7/2002 |
| WO | 03058969 A1 | 7/2003 |

OTHER PUBLICATIONS

International Search Report for PCT/US 2011/59357 dated Feb. 15, 2012.

(Continued)

*Primary Examiner* — Kieu Oanh T Bui
(74) *Attorney, Agent, or Firm* — Sughrue Mion, PLLC

(57) ABSTRACT

A method for subscribing users to a video monitoring service and video broadcast service are disclosed. Viewers can login to a secure website run by a server in the cloud to remotely view streamed video images from one or more portable video monitoring devices. The viewers and subscribers to the service have many options to select the monitoring devices and to process and customized viewed images according to their needs. A server based system implements the method, and can include a cloud server.

56 Claims, 6 Drawing Sheets

(51) Int. Cl.
*H04N 21/2343* (2011.01)
*H04N 21/239* (2011.01)
*H04N 21/2743* (2011.01)
*H04N 21/414* (2011.01)
*H04N 21/4223* (2011.01)
*G08B 13/196* (2006.01)

(56) References Cited

U.S. PATENT DOCUMENTS

| | | |
|---|---|---|
| 2004/0078825 A1 | 4/2004 | Murphy |
| 2006/0066752 A1 | 3/2006 | Kelliher |
| 2009/0009605 A1 | 1/2009 | Ortiz |
| 2009/0113505 A1 | 4/2009 | Yu |
| 2010/0013918 A1 | 1/2010 | Ta'Eed |
| 2010/0217837 A1* | 8/2010 | Ansari et al. .............. 709/218 |
| 2011/0123972 A1 | 5/2011 | Friedman |

OTHER PUBLICATIONS

Communication, dated Feb. 25, 2015, issued in corresponding EP Application No. 11875067.8, 10 pages in English.

* cited by examiner

METHOD AND SYSTEM FOR REMOTE VIDEO MONITORING AND REMOTE VIDEO BROADCAST

FIELD

The embodiments described herein relate generally to video processing and communications, and relate particularly to remote viewing of video monitoring devices over a network. As an additional aspect, the remote viewing can provide a vantage point which differs from viewer to viewer.

BACKGROUND

Video monitoring and surveillance devices such as security cameras have been used for security monitoring, traffic control, baby/elderly monitoring, video-conferencing etc. In recent years, with advances in internet and video communications as well as user accessories such as webcams, digital cameras, camcorders, and generally Personal Digital Assistant (PDA) devices, it has been possible to view or broadcast a large volume of video and audio information over the internet. In particular, there has been a migration from closed circuit systems to network control systems for video surveillance applications. There exist commercial services therewith users can install a number of cameras in their properties (e.g. home, office, backyard, or vehicle) and subscribe to a service that provides either a central monitoring service by the service provider or enables users for self-monitoring over the internet.

A majority of existing solutions are localized, meaning the monitoring cameras are installed in a place, or mounted on a vehicle. Examples are home security monitoring services, video conferencing and web broadcasting of events. While there are a number of wireless IP cameras in the market, some of which reasonably small and easily portable, the application of such devices has been limited to local (small range) networking.

There are also popular ways of broadcasting videos to a small audience, or establishing a video conference link between a few participants. Examples are Skype, Oovoo, and web chat applications where a very limited number of participants can visually connect via a Graphical User Interface (GUI) application software on their personal computers. These applications have limited flexibility of use in addition to lack of continuous monitoring capabilities.

There is a need for a service and its backbone infrastructure that can provide video monitoring capabilities from a mobile type of device to preferably mobile users. The present invention provides with embodiments that describe methods and systems for viewing live or recording images streamed from small portable video monitoring devices. For example images from a pocket-sized wireless IP video camera can be delivered to a viewers' PDA. In other words, users can place their portable cameras anywhere and watch, or let other viewers watch, the live images transmitted by the cameras from any place as long as a communication link and networking is available. In particular it is advantageous to equip the camera with a wide-angle lens, such that widening the viewing angle and eliminating mechanical controls would minimize the size and number of the monitoring cameras and facilitates their mobility and ease of use. Further, the present invention provides with a method to deliver a service as a business venture.

SUMMARY

The embodiments described herein provide in one aspect a method including registering a plurality of subscribers to a service, using a server, said service providing online viewing of video images transmitted from one or more video capture devices associated with a respective one of the plurality of subscribers, said video images being transmitted over a network via a communication link, wherein each of the video capture devices is uniquely identifiable in the network; receiving the transmitted video images from the video capture devices; managing the video image data and mediating interaction between the video image of the at least one video capture device and at least one of the plurality of subscribers and a plurality of third party viewers over the network to transmit image data to subscribers and third party viewers; controlling access of each of the plurality of subscribers with an online account to access the video images through via the network; and creating billing information based on at least one of the transmitted video images, managing of the video image and mediating the interaction.

The embodiments described herein provide in another aspect a method for distributing video images via a server and over a network, said method comprising: receiving live image data from at least one video device located at an event; sending the image data from the at least one video device via a communication link to the server, wherein each of the at least one video capture devices is equipped with image sensing, networking and wireless communication means; registering data for a plurality of viewing audience devices, so that said viewing audience devices are authorized to receive the image data from the video device located at the event; and sending a menu of control signals to the registered viewing audience devices, said menu allowing the viewing audience devices to adjust a view detail of the image data from the video device located at the event.

The embodiments described herein provide in another aspect a system comprising: registering means for registering a plurality of subscribers to a service, said service providing online viewing of video images transmitted from one or more video capture devices associated with a respective one of the plurality of subscribers, said video images being transmitted over a network via a communication link, wherein each of the video capture devices is uniquely identifiable in the network; receiving means for receiving the transmitted video images from the video capture devices; managing means for managing the video image data and mediating interaction between the video image of the at least one video capture device and at least one of the plurality of subscribers and a plurality of third party viewers over the network to transmit image data to subscribers and third party viewers; access control means for controlling access of each of the plurality of subscribers with an online account to access the video images through via the network; and billing means for creating billing information based on at least one of the transmitted video images, managing of the video image and mediating the interaction.

As a further embodiment, an aspect of the invention includes a system for distributing video images via a network, said system comprising an image receiving means for receiving live image data from at least one video capture device located at an event; sending means for sending the image data from the at least one video device via a communication link to a server, wherein each of the at least one video capture device is equipped with image sensing, and networking means; registering means for registering data for a plurality of viewing audience devices, so that said viewing audience devices are authorized to receive the image data from the video capture device located at the event; and sending means for sending a menu of control signals to the registered viewing audience devices, said menu allowing the viewing audience devices to adjust a view detail of the image data from the video device located at the event.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
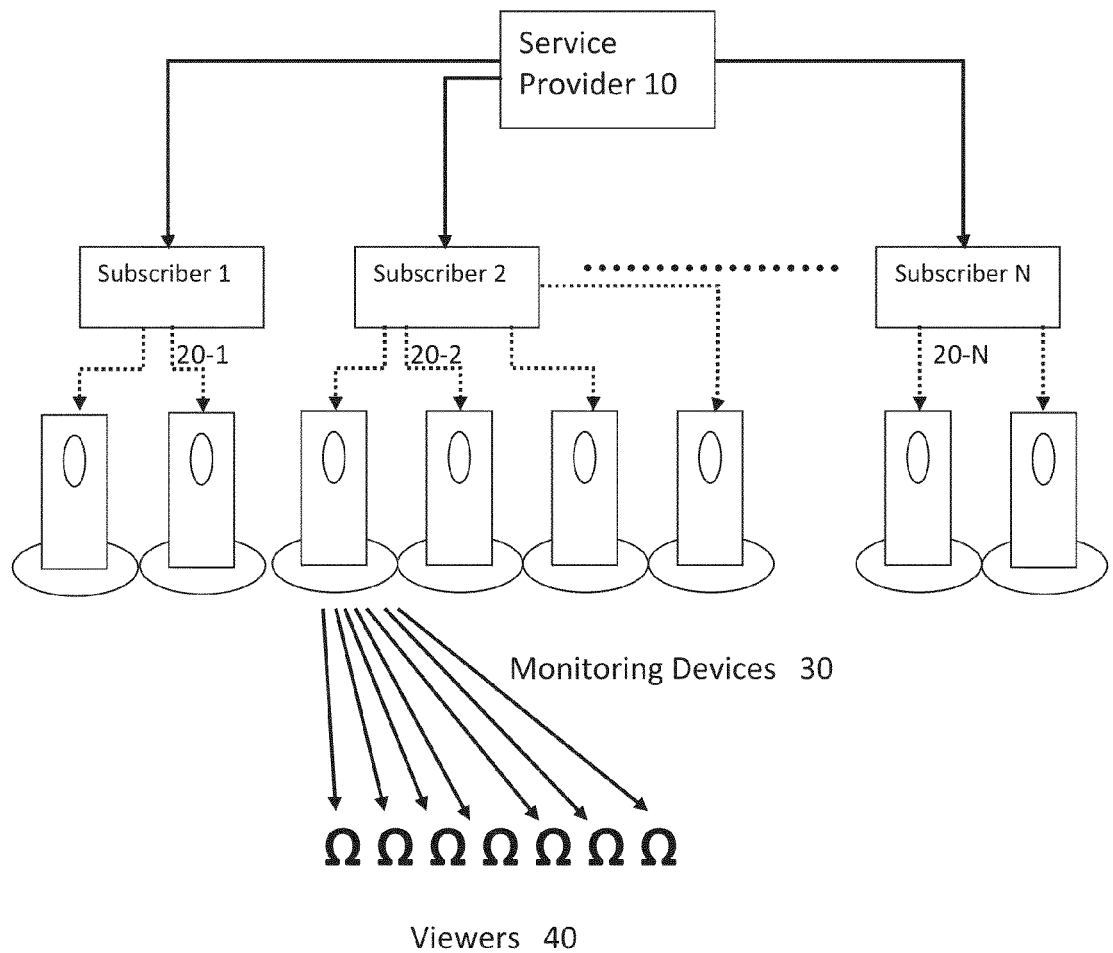
FIG. 1 illustrates general service contract between a provider and plurality of subscribers.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

FIG. 1 illustrates one embodiment of the invention. A service provider 10 signs up or registers a plurality of subscribers 20-1 to 20-N to a video (and audio) monitoring and broadcasting service. Each subscriber has at their premises at least one portable monitoring device 30, e.g. a handheld video camera, for personal or business use, wherein video images streamed from the cameras can be viewed by the subscriber or be shared with a plurality of viewers 40. Subscribers may separately buy or lease the devices, or obtain them free of charge upon signing a term contract. The service provider 10 then sets up each subscriber 20 with an online account where a viewer 40 can login securely to a website via the internet and view live images streamed from the monitoring devices over a network. It should be noted that viewers are not necessarily the subscribers. For example, a corporation may subscribe to the service and obtain a number of monitoring devices 30 for its employees. As another example, that will be described later, a subscriber grants a number of third party viewers the login and access privileges to view images from a common scene. For clarity in terminology, a viewer (also interchangeably referred to as user) applies to a subscriber and other third party viewers, as far as the technology is concerned. There is a difference between a subscriber and a non-subscribing viewer in terms of business relationships.

It should further be noted that video data may be accompanied by audio that can be utilized in many applications. Although the main focus on this invention is on video information, the disclosed techniques can be applied to audio data or audio/video combination of data.

The service provider 10 operates a cloud server or other network where the subscribers 20, all viewers 40, and the monitoring devices 30 connect to. The cloud is hosted in a shared pool of computing resources in locations unknown and irrelevant to the users. The server could also be a network of clouds interconnected through the internet. In addition to acting as a central hub for communications, the cloud server provides (directly or through a third party) bandwidth management, data compression, data encryption, data storage, real-time or offline image processing, maintenance of user accounts, contacting a third party, and related services.

Figure 2:
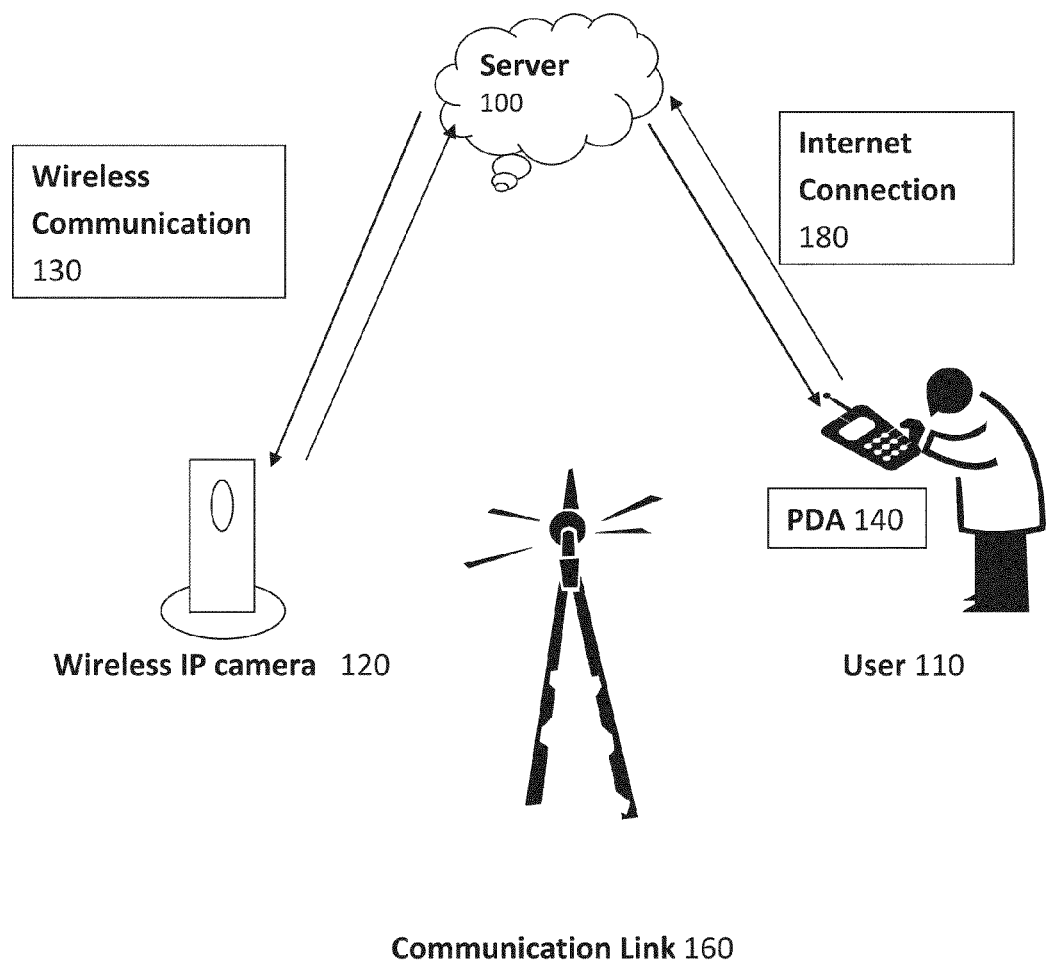
FIG. 2 illustrates the relationship between various elements of the embodied video monitoring system.

FIG. 2 illustrates an exemplary embodiment. The service provider operates a server in the cloud 100 for delivering the service to the users. A user 110 may access the online account via a viewing device 140. Preferably, the viewing device 140 acts also as hardware interface for the user. It could be a mobile device such as a personal laptop, a cellular device, tablet, etc., generally referred to as a PDA. The user 110 accesses the service by logging into his set-up account either through an internet browser or a through custom application GUI (GUI App) downloadable onto the PDA. The application may also be available via a social networking site. The service requires an internet connection 180 with the cloud servers 100 provided by any means. In a preferred embodiment the service uses a continuous communication 130 between the server 100 and the monitoring device 120 (e.g. a wireless IP camera in an exemplary embodiment) on the network provided by a communication link 160. In particular, the communication link between the camera 120 and at least portions of the communication network is preferably of wireless form, provided by various means, for instance one or any combination of cellular, Wi-Fi, Bluetooth, or satellite methods. A wireless communication enhances the portability of the monitoring devices to include secluded or untraditional places where no other communication infrastructure exists.

According to an embodied method, the server receives live images in real-time from a plurality of monitoring devices 120 connected to the network. In addition to rerouting the received images to the subscribers' accounts in real-time, the server may record and save several hours of the captured video up to a prescribed storage capacity, upon the user's request. Users would then have the option to play back the stored clips, apply extra post-processing of images, email the clips to others, move and save them locally, and delete after viewing or automatically after a certain period of time. Some or all the real-time and/or offline image processing tasks can also be performed by the server, if equipped with image processing units. Those include, but are not limited to, geometric transformations, optical corrections, color/brightness adjustments, image scaling, detail enhancement, noise reduction and monitoring device (camera) calibration. Having the image processing performed at the cloud server substantially lowers the cost of monitoring units. In principle, a monitoring device can act solely as a video (and optionally audio) capture and transmitter.

Figure 3:
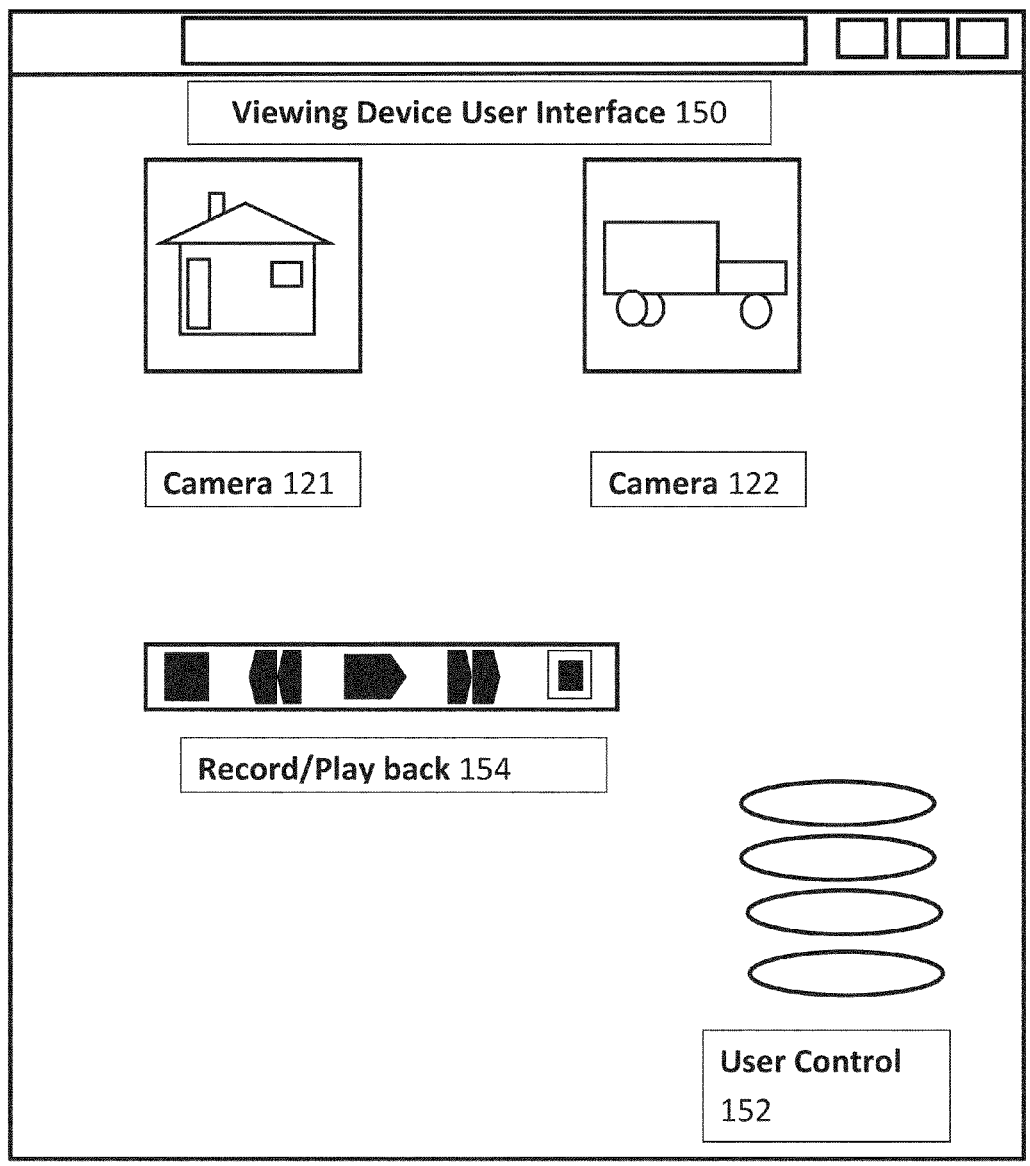
FIG. 3 illustrates an exemplary interface on a viewing device, wherein a viewer can watch video images from a plurality of monitoring devices, and interact with them.

By accessing the online account through an interface 150 on a viewing device, as shown in FIG. 3, a viewer is able to access a plurality of video cameras and view the streamed video images in real-time. For example, he can select camera 121 monitoring the house and camera 122 monitoring the car in this exemplary illustration. In an alternative embodiment, a user may select recording option 154 and save the captured image data on the server in order to play them back offline at a later time. The user is capable of manipulating the saved image data by adjusting control settings 152, applying editorial commands, download selected clips on his PDA or email video clips to other parties.

It is preferred that the monitoring devices 120 to be mobile and easily get carried around and placed anywhere as stand alone units. In one embodiment, the monitoring device is a handheld video camera comprising image sensors, and optics. Analogous to other small personal devices such as cell phones and digital cameras, ease of use implies no permanent mounting or wiring. As such, the monitoring devices 120 should have wireless communication capabilities. They should operate on batteries (rechargeable, solar cell, disposable) in addition to having optional USB power or AC adaptors for extended use or battery charging. Further, each device should be uniquely recognizable on the internet by a unique IP address, preferably a dynamic IP address for higher security.

In one exemplary embodiment, an image processing unit may be integrated to the monitoring device so that some image processing operations including geometric transforms, optical corrections, color/brightness adjustments, scaling, detail enhancement, noise reduction and camera calibration can be performed locally at the monitoring device. Although this option would make the device more costly, it would save communication bandwidth and prevent the network from overuse. This option may be desirable for more sophisticated users.

In one embodiment, the monitoring device is equipped with a wide-angle lens (such as a fisheye lens) for capturing a large field of view. It is also possible to use a combination of wide-angle lenses to enable the device with panoramic or even up to a 360° of viewing capabilities. This would increase the viewing angle without a need for mechanically moving the camera, as is the case in some existing products. It further eliminates the need to use more than one camera to cover one area. Alternatively, a user can arrange a number of devices, e.g. two back to back cameras each having a 180° fisheye lens, to get an equivalent viewing experience. In this case the processing power of the cloud server is further increased to accommodate extra user control instructions, more notably operations such as pan/tilt/zoom (PTZ), horizontal/vertical flip and rotation. Additionally, the optional image processing unit integrated to the device may be enabled to perform the flip, rotation and PTZ operations locally at the camera. These types of processing are known to those skilled in the art, such as U.S. Pat. No. 7,324,706. Other examples include U.S. Pat. Nos. 7,474,799; 7,576,767 and 8,055,070.

In another exemplary embodiment, the monitoring device includes a motion sensor. To save energy and minimize the amount of unnecessary data collection or communication, e.g. in a video monitoring application, the motion sensor can trigger the video transmission and/or recording upon detecting motion within the range of view. Moreover, the monitoring device can be programmed to go dormant when no motion is detected after a certain period of time. The same concept is applicable to sound detection. Several other optional features can be added to the monitoring device's functionality depending on applications required by subscribers. Exemplary options are, but not limited to, augmenting a GPS, gyroscope or compass for acquiring positional and directional coordination information, integrating an infrared imagery means for night vision imaging, adding a speaker, a flash light, an LED indicator, etc.

In another exemplary embodiment, the monitoring devices could be equipped with memory and disk space to optionally record a few hours of video streaming for backup purposes, for instance in case of network connection disruptions. Additionally, the device may regularly test the connection to the cloud server (e.g. by pinging) and automatically start/stop recording upon disconnect/reconnect to the network.

Figure 4:
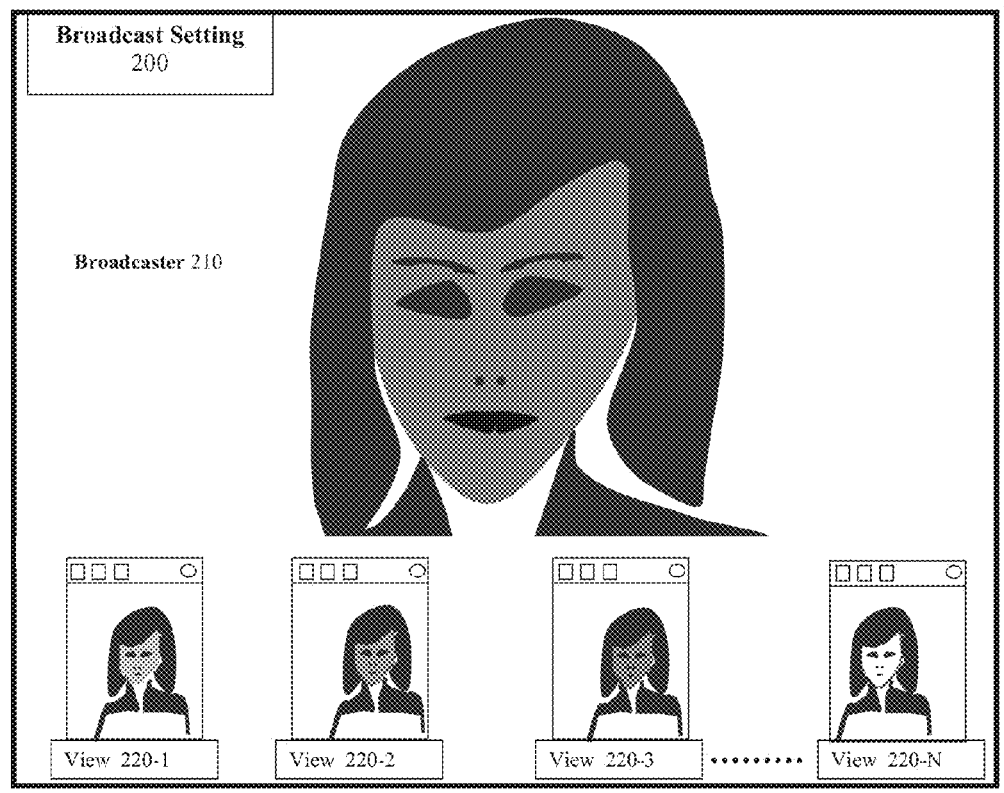
FIG. 4 illustrates an exemplary broadcasting configuration from the service user.

As mentioned above, the subscribers have an option to share the login privileges with a plurality of third party viewers. FIG. 4 illustrates an exemplary embodiment of a broadcast application setting 200, where the cloud server accommodates simultaneous logins to the server and multiple viewing of images transmitted by a user broadcaster 210 through her mobile monitoring device.

This is particularly useful when the user intends to broadcast an event to a plurality of viewers. Each viewer watches the broadcaster 210 simultaneously on their own viewing devices (views 220-1, 220-2, . . . , and 220-N) by logging into the assigned website on the server. Further, each viewer can independently control and perform image processing functions such as electronic pan, tilt and zooming (PTZ) to personalize their viewing experience of the common scene without affecting other viewers. If multiple cameras are networked together, each viewer can choose which camera(s) to view at any one time. Examples of the usefulness of group viewing are business travelers, music bands, sporting teams/individuals, speakers, entertainers, family events and alike. Subscribers can grant their family, friends and fans online viewing privileges virtually from anywhere, and provide them with a personally customized viewing experience.

Figure 5:
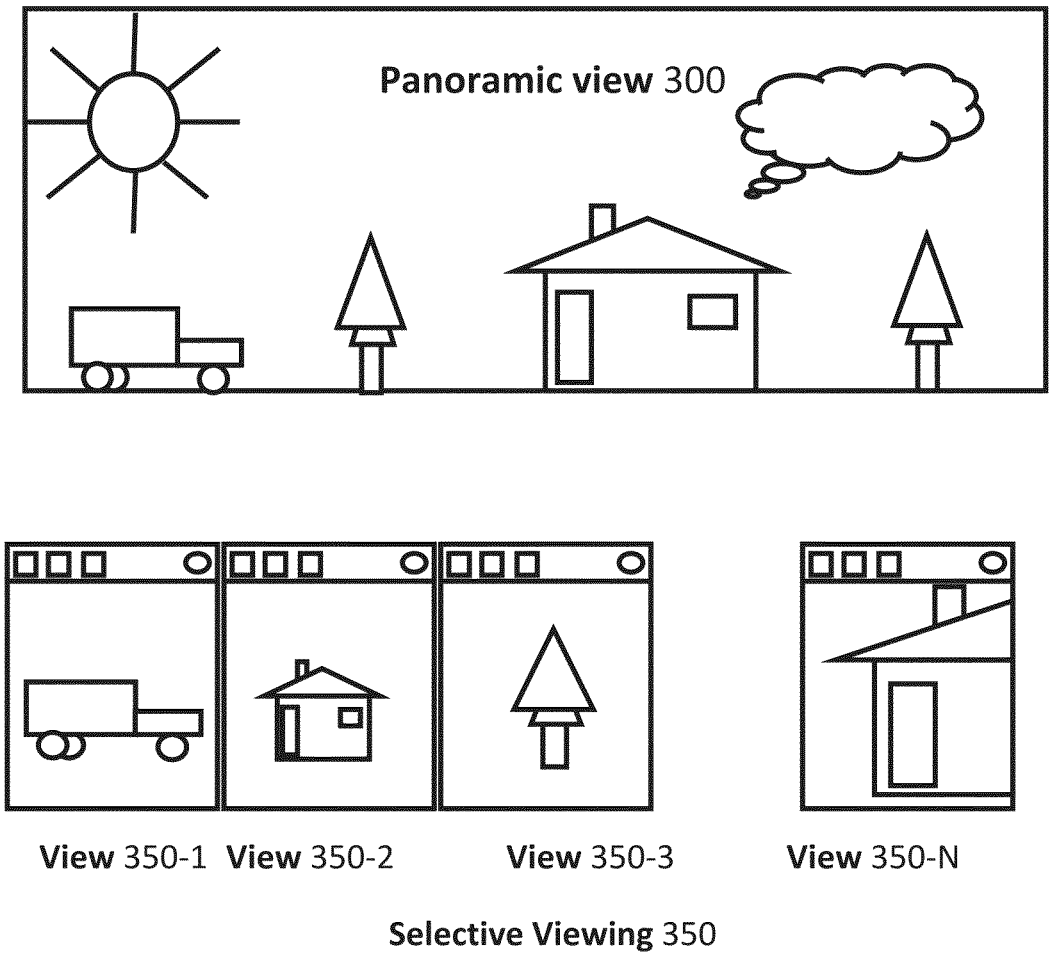
FIG. 5 illustrates an exemplary application wherein different viewers can view a selected portion of a panoramic view using PTZ capabilities.

FIG. 5 illustrates an exemplary application where a monitoring device equipped with a wide-angle lens streams a panoramic view 300 of a scene. A plurality of viewers may simultaneously access the video but pick different views (350-1 to 350-N) of the same panorama on their own displays. The viewers have the ability to move around the image (pan and tilting) to pick a portion of the view, and further zoom in (e.g. 350-N) and out (e.g. 350-2) as long as permitted by digital zoom capability of the camera lens. A web interface or a custom app provide by the service provider facilitates user's interaction with the image.

Figure 6:
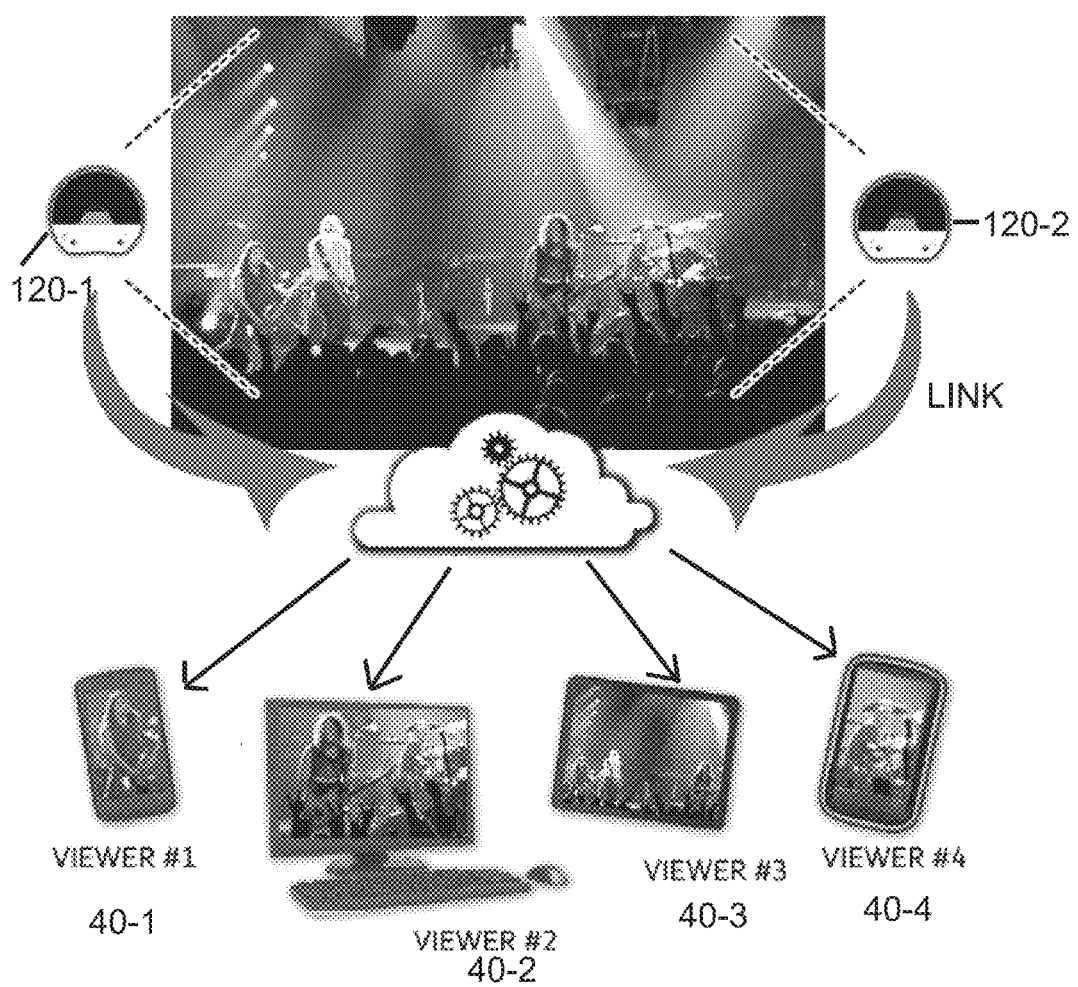
FIG. 6 illustrates an exemplary embodiment where capturing devices broadcast to different viewing devices and each viewing device shows a different customizable vantage point.

FIG. 6 illustrates an exemplary embodiment whereby multiple image capture devices (indicated by circular reference elements 120-1 and 120-2) are installed at an event, such as a concert. The image data is transmitted via a communication link and/or network to multiple end users, who have registered or are otherwise authorized to view the image data. Each of the multiple end user devices 40-1, 40-2, 40-3 and 40-4 is able to display a different view of the event. This is based on user-controllable signals that are transferred back to either an event site or a server site to adjust one or more of the video streams from capture devices installed at the event. Such vantage point adjustments controllable by the user can include a downloadable set of commands for flip, pan, tilt or zoom, for example.

As long as a communication link is available, users are able to view live or pre-recorded images through the server and over the internet. Further, users may remotely control and interact with their cameras in real-time. The image processing tools can be integrated with the monitoring device or be part of the server's computing capabilities. In the latter case, simultaneous user interaction with one device is possible without interfering with other users. The server can also store multiple copies of received image data from a location, and a viewer can select which of the views or copies are to be displayed and manipulated.

The disclosed technology opens up various useful applications for subscribers to the service. A traveler may carry a monitoring camera where his family from home or colleagues from work could see him anywhere he is. A user can place one small mobile camera at home, inside car, in a hotel room, etc. for monitoring the area. It would eliminate need for multiple cameras, local networking setups, and subscription to multiple services.

Referring back to FIG. 1, the service provider 10 may charge the subscribers using various means. Subscribers 30 may pay an initiation or sign-up fee followed by a periodic (monthly, annual, etc.) subscription fee. Further, for a large volume of data communication that requires extra bandwidth, the service provider can be compensated proportionally. That also applies to volume of recorded video data that is stored on the server. The service provider 10 may provide monitoring devices free of charge but charge for usage, or charge advertisers on its websites. Further the subscribers 30 are able to setup a sub-contract or pay-per-view arrangement to monetize their broadcast. For example, a live band may grant online access to their viewers 40 for a charge. Additionally, they may collect royalty from advertisers. A royalty based or bandwidth usage based compensation can also be arranged between the subscriber 30 and the service provider 10.

The functional aspects of registering subscribers, controlling access to images and the network, managing data and mediating access to the network can be implemented on one or more programmed processors. The specific details are within the abilities and knowledge of one skilled in the art, and the details are not set forth here.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method comprising steps of:
   a. registering a plurality of subscribers to a service, said service providing viewing of video images received from one or more video capture devices associated with a respective one of the plurality of subscribers, said video images being transmitted to a network via at least one cellular communication link, wherein each of the one or more video capture devices is uniquely identifiable in the network;
   b. receiving the video images selected by the respective one of the plurality of subscribers for transmission from the one or more video capture devices;
   c. managing the received video images, using a server, and enabling at least one of the respective one of the plurality of subscribers and a plurality of authorized viewers to interact with the video images over the network, the authorized viewers being temporarily allowed access to the video images over the network without being a subscriber;
   d. transmitting requested video images to the at least one of the respective one of the plurality of subscribers and a plurality of authorized viewers;
   e. controlling access to the video images through the network according to instructions from the respective one of the plurality of subscribers;
   f. creating billing information based on at least one of bandwidth of the transmitted video images, managing of the video images and viewers interaction; and
   g. wherein controlling access of the subscribers includes setting up a plurality of subscribers with a custom GUI application on a viewing device.

2. The method of claim 1, wherein at least one video capture device is a handheld device.

3. The method of claim 2, wherein transmitting requested video images to the plurality of authorized viewers comprises a broadcast to the plurality of authorized viewers.

4. The method of claim 1, wherein at least one video capture device further includes audio communication means.

5. The method of claim 1, wherein controlling access includes setting up a plurality of subscribers with a secure website to access the registered video capture devices through a viewing device.

6. The method of claim 1, wherein the respective one of the plurality of subscribers grants access privileges to at least one third party viewer.

7. The method of claim 1, wherein each of the respective one of the plurality of subscribers and a plurality of viewers can customize viewing by independently applying a set of user control instructions.

8. The method of claim 1, wherein the network further includes at least one of Wi-Fi, Bluetooth, and satellite communication links.

9. The method of claim 1, wherein the received video images are recorded and stored in the server.

10. The method of claim 9, wherein the server performs image processing operations on the stored video images offline.

11. The method of claim 9, wherein the image processing comprises at least one of user control operations of geometric distortion correction, optical distortion correction, flip, rotation, pan, tilt, and zoom operations, wherein each of plural viewers can independently view a customized video image.

12. The method of claim 1, wherein the server performs image processing operations on the received video images in real-time.

13. The method of claim 1, wherein at least one video capture device is battery operated.

14. The method of claim 1, wherein at least one video capture device is equipped with a wide-angle lens.

15. The method of claim 14, wherein the at least one video capture device includes a fisheye lens.

16. The method of claim 1, wherein at least one video capture device is equipped with a plurality of lenses capable of up to 360° of image capture.

17. The method of claim 1, wherein at least one video capture device is equipped with an image processing unit.

18. The method of claim 17, wherein the image processing unit includes at least one of user control operations of geometric distortion correction, optical distortion correction, rotation, flip, pan, tilt, and zoom operations.

19. The method of claim 1, wherein at least one video capture device is equipped with at least one of a motion sensor and a sound sensor to trigger video transmission.

20. The method of claim 1, wherein the at least one sensor equipped video capture device is programmed to go dormant when no motion is detected for a certain time period.

21. The method of claim 1, wherein at least one video capture device is equipped with at least one of GPS, gyroscope, and compass devices.

22. The method of claim 1, wherein at least one video capturing device is equipped with infrared imagery means.

23. The method of claim 1, wherein the billing information is further compiled based on one or more of:
   a. sign-up on registration;
   b. periodic flat dues;
   c. bandwidth usage;
   d. data storage; and
   e. a third party royalty.

24. The method of claim 1, further comprising supplying a plurality of subscribers with at least one video capture device.

25. The method of claim 24, wherein the at least one video capture device is supplied at a discount price upon signing a term contract.

26. The method of claim 1, wherein at least one of the plurality of subscribers grants access privileges to at least one third party viewer for a charge.

27. The method of claim 1, wherein the server comprises a cloud server operated by the service provider.

28. A method for distributing video images via a server and over a network, said method comprising:
   a. receiving image data from at least one video capture device via at least one cellular communication link to the network, wherein each of the at least one video capture devices is equipped with image sensing, networking and cellular communication means;
   b. registering data for a plurality of viewing devices, so that said viewing devices are authorized to receive the image data from the at least one video capture device; and
   c. managing the received image data and enabling at least one of the registered viewing devices to interact with the image data from the at least one video capture device, via the server over the network, the registered viewing devices being temporarily allowed access to the image data over the network without being a subscriber to the network;
   d. transmitting requested image data to at least one of the plurality of viewing devices; and
   e. wherein at least one viewing device accesses the image data corresponding to the at least one video capture device via a custom GUI application on the viewing device.

29. The method of claim 28, wherein at least one video capture device is equipped with audio communication means.

30. The method of claim 28, wherein each of the plurality of viewing devices can customize viewing by independently applying a set of user control instructions to the image data corresponding to the at least one video capture device.

31. The method of claim 28, wherein the network further includes at least one of Wi-Fi, Bluetooth, and satellite communication links.

32. The method of claim 28, wherein the server records and stores the received image data.

33. The method of claim 32, wherein the server performs image processing operations on the stored image data offline.

34. The method of claim 33, wherein the image processing comprises at least one of user control operations of geometric distortion correction, optical distortion correction, flip, rotation, pan, tilt, and zoom of the image data, wherein each of plural viewers can independently view a different orientation and portion of the video image.

35. The method of claim 28, wherein the server performs image processing operations on the image data for at least one image in real-time.

36. The method of claim 28, wherein at least one video capture device is equipped with a wide-angle lens.

37. The method of claim 28, wherein at least one video capture device is equipped with a plurality of lenses capable of up to 360° image capture.

38. The method of claim 28, wherein at least one video capture device is equipped with an image processing unit.

39. The method of claim 38, wherein the image processing unit includes at least one of user control operations of geometric distortion correction, optical distortion correction, rotation, flip, pan, tilt, and zoom operations.

40. The method of claim 28, wherein at least one video capture device is equipped with at least one of motion sensor and sound sensor to trigger video transmission.

41. The method of claim 40, wherein at least one video capture device is programmed to go dormant when no motion is detected for a period of time.

42. The method of claim 28, wherein at least one video capture device is equipped with infrared imagery means.

43. The method of claim 28, wherein at least one video capture device includes means to record and store portions of streamed video.

44. The method of claim 28, wherein a plurality of viewers associated with the plurality of viewing devices simultaneously access the image data received from the at least one video capture device.

45. The method of claim 28, wherein at least one viewing device is equipped with cellular communication means and connected to a cellular network.

46. The method of claim 28, wherein the requested image data is accessed through a secure website maintained at the server.

47. A system comprising:
   a. registering means for registering a plurality of subscribers to a service, said service providing viewing of video images transmitted from one or more video capture devices associated with a respective one of the plurality of subscribers, said video images being transmitted to a network via at least one cellular communication link, wherein each of the video capture devices is uniquely identifiable in the network;
   b. receiving means for receiving the video images selected by the respective one of the plurality of subscribers for transmission from the video capture devices;
   c. managing means for managing the received video images and enabling at least one of the respective one of the plurality of subscribers and a plurality of authorized viewers to interact with the received video images over the network, the authorized viewers being temporarily allowed access to the video images over the network without being a subscriber;
   d. transmitting means for transmitting requested video images to the at least one of the respective one of the plurality of subscribers and a plurality of authorized viewers;
   e. access control means for controlling access to the video images through the network according to instructions from the respective one of the plurality of subscribers;
   f. billing means for creating billing information based on at least one of bandwidth of the transmitted video images, managing of the video images and viewers interaction; and
   g. wherein the managing means receives control information from at least one of the respective one of the plurality of subscribers and a plurality of viewers for customized viewing by independently applying a set of user control instructions.

48. The system of claim 47, wherein customizing the viewing orientation includes applying at least one of geometric distortion correction, optical distortion correction, flip, pan, tilts and zoom operations.

49. The system of claim 47, wherein the access control means allows access to the image data for the plurality of viewers based on authorization from the respected one of the plurality of subscribers.

50. The system of claim 47, wherein at least one video capture device is a handheld device.

51. The system of claim 47, wherein at least one video capture device includes a fisheye lens.

52. A system for distributing video images via a server over a network, said system comprising:
  a. image receiving means for receiving image data from at least one video capture device via at least one communication link to the network, wherein each of the at least one video capture devices is equipped with image sensing, networking, and cellular means;
  b. registering means for registering data for a plurality of viewing devices, so that said viewing devices are authorized to receive the image data from the at least one video capture device; and
  c. managing means for managing the received image data and enabling the registered viewing devices to interact with the image data from the at least one video capture device, via the server over the network, the registered viewing devices being temporarily allowed access to the image data over the network without being a subscriber to the network;
  d. transmitting means for transmitting requested image data to at least one of the plurality of viewing devices; and
  e. wherein the receiving means receives control signals so that the viewing devices can independently customize viewing orientation of the image data.

53. The system of claim 52 wherein customizing the viewing orientation includes applying at least one of geometric distortion correction, optical distortion correction flip, pan, tilt and zoom operations.

54. The system of claim 52, wherein at least one of the viewing devices is a handheld device.

55. The system of claim 52, wherein at least one of the video capture devices includes a fisheye lens.

56. The method of claim 52, wherein at least one viewing device is equipped with cellular communication means and connected to a cellular network.

* * * * *